(12) United States Patent
Yoon et al.

(10) Patent No.: US 10,051,556 B2
(45) Date of Patent: *Aug. 14, 2018

(54) METHOD FOR SCANNING FOR ACCESS POINT IN WIRELESS LAN SYSTEM

(71) Applicant: KT Corporation, Seongnam-si (KR)

(72) Inventors: Byung Wan Yoon, Seoul (KR); Su Hwan Rim, Seoul (KR)

(73) Assignee: KT Corporation, Seongnam-si (KR)

( * ) Notice: Subject to any disclaimer, the term of this patent is extended or adjusted under 35 U.S.C. 154(b) by 0 days.

This patent is subject to a terminal disclaimer.

(21) Appl. No.: 15/618,443

(22) Filed: Jun. 9, 2017

(65) Prior Publication Data

US 2017/0280375 A1   Sep. 28, 2017

Related U.S. Application Data

(63) Continuation of application No. 14/411,278, filed as application No. PCT/KR2013/005733 on Jun. 27, 2013, now Pat. No. 9,717,037.

(30) Foreign Application Priority Data

Jun. 28, 2012 (KR) .................. 10-2012-0070043
Jun. 4, 2013 (KR) .................. 10-2013-0063860

(51) Int. Cl.
*H04W 48/14* (2009.01)
*H04W 84/12* (2009.01)

(52) U.S. Cl.
CPC ............ *H04W 48/14* (2013.01); *H04W 84/12* (2013.01)

(58) Field of Classification Search
CPC .............................. H04W 48/14; H04W 84/12
See application file for complete search history.

(56) References Cited

U.S. PATENT DOCUMENTS

| 8,509,173 | B2 | 8/2013 | Kim et al. | |
|---|---|---|---|---|
| 2005/0227623 | A1* | 10/2005 | Su | H04W 16/10 455/62 |
| 2008/0014934 | A1 | 1/2008 | Blalasubramanian et al. | |
| 2009/0046633 | A1* | 2/2009 | Thomson | H04W 64/00 370/328 |
| 2010/0118830 | A1* | 5/2010 | Stephenson | H04L 63/10 370/331 |
| 2010/0284303 | A1 | 11/2010 | Catovic et al. | |
| 2011/0149766 | A1 | 6/2011 | Choi et al. | |
| 2011/0188486 | A1 | 8/2011 | Kim et al. | |
| 2011/0243013 | A1 | 10/2011 | Lee et al. | |
| 2012/0044862 | A1* | 2/2012 | Chen | H04W 36/00 370/328 |

(Continued)

OTHER PUBLICATIONS

International Search Report for PCT/KR2013/005733 dated Oct. 25, 2013.

(Continued)

*Primary Examiner* — Ajay Cattungal

(74) *Attorney, Agent, or Firm* — Sughrue Mion, PLLC

(57) ABSTRACT

Disclosed is a method for scanning for an access point. An active scan method comprises the steps of: generating a probe request frame including information on the signal strength of a terminal; and transmitting the probe request frame to an access point. Thus, a waste of time and radio resources can be prevented.

11 Claims, 11 Drawing Sheets

(56) References Cited

U.S. PATENT DOCUMENTS

| | | | | |
|---|---|---|---|---|
| 2012/0044914 A1* | 2/2012 | Chen | ............ | H04W 12/08 |
| | | | | 370/338 |
| 2012/0108173 A1* | 5/2012 | Hahm | ............ | H04W 76/10 |
| | | | | 455/41.2 |
| 2012/0307685 A1 | 12/2012 | Kim et al. | | |
| 2013/0086665 A1* | 4/2013 | Filippi | ............ | H04L 63/0272 |
| | | | | 726/7 |
| 2013/0231151 A1* | 9/2013 | Kneckt | ............ | H04W 40/246 |
| | | | | 455/515 |
| 2013/0294354 A1* | 11/2013 | Zhang | ............ | H04W 72/04 |
| | | | | 370/329 |
| 2015/0098358 A1* | 4/2015 | Park | ............ | H04W 48/16 |
| | | | | 370/254 |
| 2015/0189673 A1* | 7/2015 | Park | ............ | H04W 48/08 |
| | | | | 370/329 |
| 2016/0007386 A1* | 1/2016 | Park | ............ | H04W 76/10 |
| | | | | 370/329 |

OTHER PUBLICATIONS

Non-Final Office Action dated Feb. 2, 2016 in U.S. Appl. No. 14/411,278.
Final Office Action dated Oct. 21, 2016 in U.S. Appl. No. 14/411,278.
Advisory Action dated Jan. 26, 2017 in U.S. Appl. No. 14/411,278.
Notice of Allowance dated Mar. 9, 2017 in U.S. Appl. No. 14/411,278.

* cited by examiner

FIG. 5

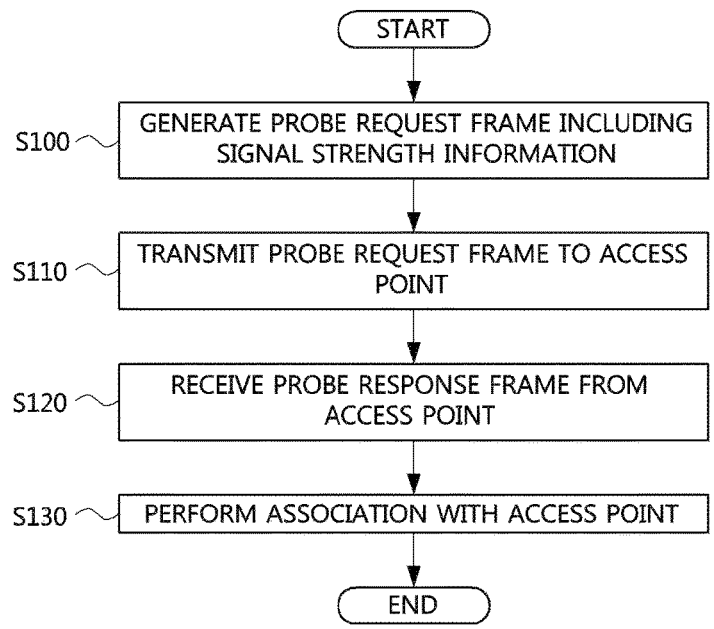

FIG. 6

| Order | Information | Notes |
|---|---|---|
| 1 | SSID | |
| 2 | Supported rates | |
| 3 | Request information | May be included if dot11MultiDomainCapabilityEnabled is true. |
| 4 | Extended Supported Rates | The Extended Supported Rates element is present whenever there are more than eight supported rates, and it is optional otherwise. |
| 5 | Tx Power | |
| Last | Vendor Specific | One or more vendor-specific information elements may appear in this frame. This information element follows all other information elements. |

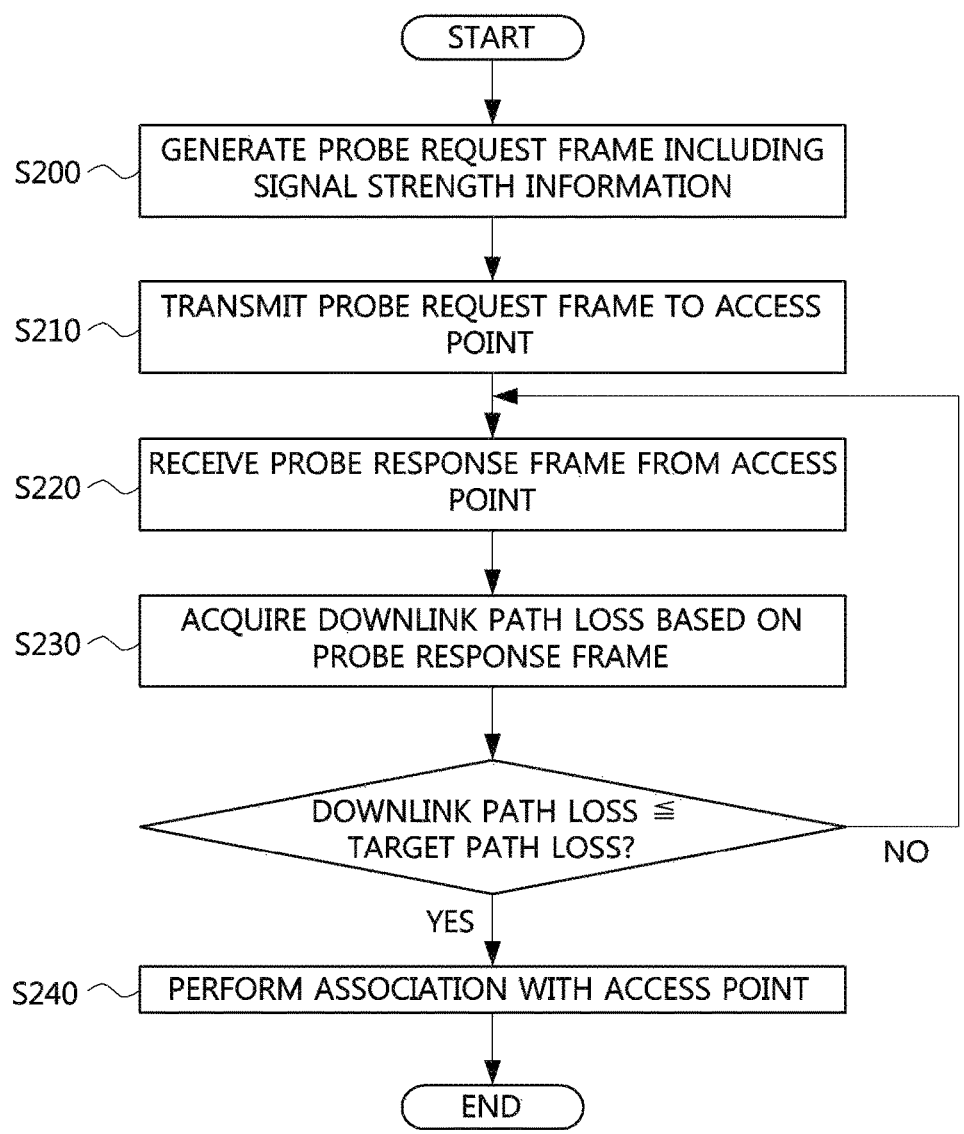

FIG. 8

| Order | Information | Notes |
|---|---|---|
| 1 | Timestamp | |
| 2 | Beacon interval | |
| 3 | Capability | |
| 4 | SSID | |
| 5 | Supported rates | |
| 6 | FH Parameter Set | The FH Parameter Set information element is present within Probe Response frames generated by STAs using FH PHYs. |
| 7 | DS Parameter Set | The DS Parameter Set information element is present within Probe Response frames generated by STAs using Clause 15, Clause 18, and Clause 19 PHYs. |
| 8 | CF Parameter Set | The CF Parameter Set information element is present only within Probe Response frames generated by APs supporting a PCF. |
| 9 | IBSS Parameter Set | The IBSS Parameter Set information element is present only within Probe Response frames generated by STAs in an IBSS. |
| 10 | Country | Included if dot11MultiDomainCapabilityEnabled or dot11SpectrumManagementRequired is true. |
| 11 | FH Parameters | FH Parameters, as specified in 7.3.2.10, may be included if dot11MultiDomainCapabilityEnabled is true. |
| 12 | FH Pattern Table | FH Pattern Table information, as specified in 7.3.2.11, may be included if dot11MultiDomainCapabilityEnabled is true. |
| 13 | Power Constraint | Shall be included if dot11SpectrumManagementRequired is true. |
| 14 | Channel Switch Announcement | May be included if dot11SpectrumManagementRequired is true. |

FIG. 9

| Order | Information | Notes |
|---|---|---|
| 15 | Quiet | May be included if dot11SpectrumManagementRequired is true. |
| 16 | IBSS DFS | Shall be included if dot11SpectrumManagementRequired is true in an IBSS. |
| 17 | TPC Report | Shall be included if dot11SpectrumManagementRequired is true. |
| 18 | ERP Information | The ERP Information element is present within Probe Response frames generated by STAs using ERPs and is optionally present in other cases. |
| 19 | Extended Supported Rates | The Extended Supported Rates element is present whenever there are more than eight supported rates, and it is optional otherwise. |
| 20 | RSN | The RSN information element is only present within Probe Response frames generated by STAs that have dot11RSNAEnabled set to TRUE. |
| 21 | BSS Load | The BSS Load element is present when dot11QosOption- Implemented and dot11QBSSLoadImplemented are both true. |
| 22 | EDCA Parameter Set | The EDCA Parameter Set element is present when dot11QosOptionImplemented is true. |
| 23 | Target Pathloss | |

METHOD FOR SCANNING FOR ACCESS POINT IN WIRELESS LAN SYSTEM

CLAIM FOR PRIORITY

This application is a continuation of U.S. application Ser. No. 14/411,278 filed Dec. 24, 2014, which claims priority to Korean Patent Application No. 2012-0070043 filed on Jun. 28, 2012 and No. 2013-0063860 filed on Jun. 4, 2013 in the Korean Intellectual Property Office (KIPO), the entire contents of which are hereby incorporated by reference.

BACKGROUND

1. Technical Field

Example embodiments of the present invention relate in general to the field of an access point scan method, and more particularly, to an access point scan method using an active scan scheme in a wireless LAN system.

2. Related Art

Various wireless communication technologies have been developed together with information communication technologies. Wireless local area network (WLAN) belonging to the wireless communication technologies is a technology allowing wireless internet access at home or business or at a designated service providing region by using a portable terminal, such as a personal digital assistant (PDA), a laptop computer, and a portable multimedia player (PMP) based on wireless frequency technologies.

As the standard of the WLAN, Institute of Electrical and Electronics Engineers (IEEE) 802.11 standards have been developed. IEEE 802.11a provides a transmission speed of 54 Mbps by using an unlicensed band of 5 GHz. IEEE 802.11b provides a transmission speed of 11 Mbps by using direct sequence spread spectrum (DSSS) at 2.4 GHz. IEEE 802.11g provides a transmission speed of 54 Mbps by using orthogonal frequency division multiplexing (OFDM) at 2.4 GHz. IEEE 802.11n provides a transmission speed of 300 Mbps with respect to two spatial streams by using multiple input multiple output-OFDM (MIMO-OFDM). IEEE 802.11n supports a channel bandwidth of 40 MHz at the maximum, and provides a transmission speed of 600 Mbps. As the propagation of the WLAN becomes more active and applications using the WLAN are diversified, there is an increasing need for a new WLAN technology capable of supporting a throughput higher than the data processing speed supported by IEEE 802.11n. WLAN technology for very high throughput (VHT) is one of the IEEE 802.11 WLAN technologies suggested to support a data processing speed of 1 Gps or more. As one of the VHT WLAN technologies, IEEE 802.11ac is developed as a standard for supporting a VHT at a frequency band of 5 GHz or below, and IEEE 802.11ad is developed as a standard for supporting a VHT at a frequency band of 60 GHz.

In a system based on the WLAN technology, an access point scan method includes an active scan method and a passive scan method. According to the active access point scan method, a station transmits a probe request frame, and an access point having received the probe request frame transmits a probe response frame in response to the received probe request frame.

Upon requesting responses from a plurality of undesignated access points by setting a service set identifier (SSID) of a probe request frame in a state of null, the station receives a probe response frame from the access points during a maximum probe response time Max_Probe_Response_Time, and requests access at an access point whose wireless environment is the most superior among the access points having transmitted probe response frames. That is, even after a probe response frame is received from an access point having a superior wireless environment, the station waits for the maximum probe response time to pass, and then requests an access at the access point, thereby causing waste of time.

In the position of an access point, the access point needs to respond in the form of a probe response frame at each of the probe request frames being received, so the response is unconditionally made without consideration of a wireless environment, thereby causing waste of wireless resources.

SUMMARY

Accordingly, example embodiments of the present invention are provided to substantially obviate one or more problems due to limitations and disadvantages of the related art.

Example embodiments of the present invention provide an access point scan method capable of performing an active scan by using a probe request frame including output information of a station.

Example embodiments of the present invention also provide an access point scan method capable of performing an active scan by using a probe response frame including output information of an access point.

In some example embodiments, an active scan method performed at a station includes generating a probe request frame including signal strength information of the station, and transmitting the probe request frame to access points.

The signal strength information may include information about transmission power of the station.

The active scan method may further include: receiving a probe response frame corresponding to the probe request frame from a certain access point; and performing an access to the certain access point, wherein the certain access point may be an access point satisfying a predetermined standard for an uplink quality with respect to the station.

In the performing of the access to the certain access point, an access to the certain access point may be performed before a maximum probe response time elapses.

The active scan method may further include: receiving a probe response frame corresponding to the probe request frame from a certain access point; acquiring a downlink path loss based on signal strength of the probe response frame; and performing an access to the certain access point if the downlink path loss satisfies a predetermined standard.

The probe response frame may include target path loss information as the predetermined standard.

In the performing of access to the certain access point, the access to the certain access point may be performed before a maximum probe response time elapses.

The certain access point may be an access point satisfying the predetermined standard for the uplink quality with respect to the station.

In other example embodiments, an active scan method performed at a station includes: transmitting a probe request frame to access points; receiving a probe response frame corresponding to the probe request frame from a certain access point; acquiring information about downlink quality based on signal strength of the probe response frame; and performing an access to the certain access point if the downlink quality satisfies a predetermined standard.

The downlink quality information may include downlink path loss information.

The probe response frame may include target path loss information as the predetermined standard.

In still other example embodiments, an active scan method performed at an access point include: receiving a probe request frame from a station; acquiring information about uplink quality based on signal strength information of the station included in the probe request frame; and transmitting a probe response frame to the station if the uplink quality satisfies a predetermined standard.

The signal strength information may include transmission power of the station.

The uplink quality information may include uplink path loss information.

In the transmitting of the probe response frame, the probe response frame including target path loss information may be transmitted.

BRIEF DESCRIPTION OF DRAWINGS

Example embodiments of the present invention will become more apparent by describing in detail example embodiments of the present invention with reference to the accompanying drawings, in which:

FIG. 5 is a flowchart showing an active scan method according to an example embodiment of the present invention;

FIG. 6 is a conceptual view illustrating the configuration of a probe request frame;

FIG. 7 is a flowchart showing an active scan method according to another example embodiment of the present invention;

FIG. 8 is a conceptual view illustrating the configuration of a probe response frame (1 to 14);

FIG. 9 is a conceptual view illustrating the configuration of a probe response frame (15 to 23);

DESCRIPTION OF EXAMPLE EMBODIMENTS

Figure 1:
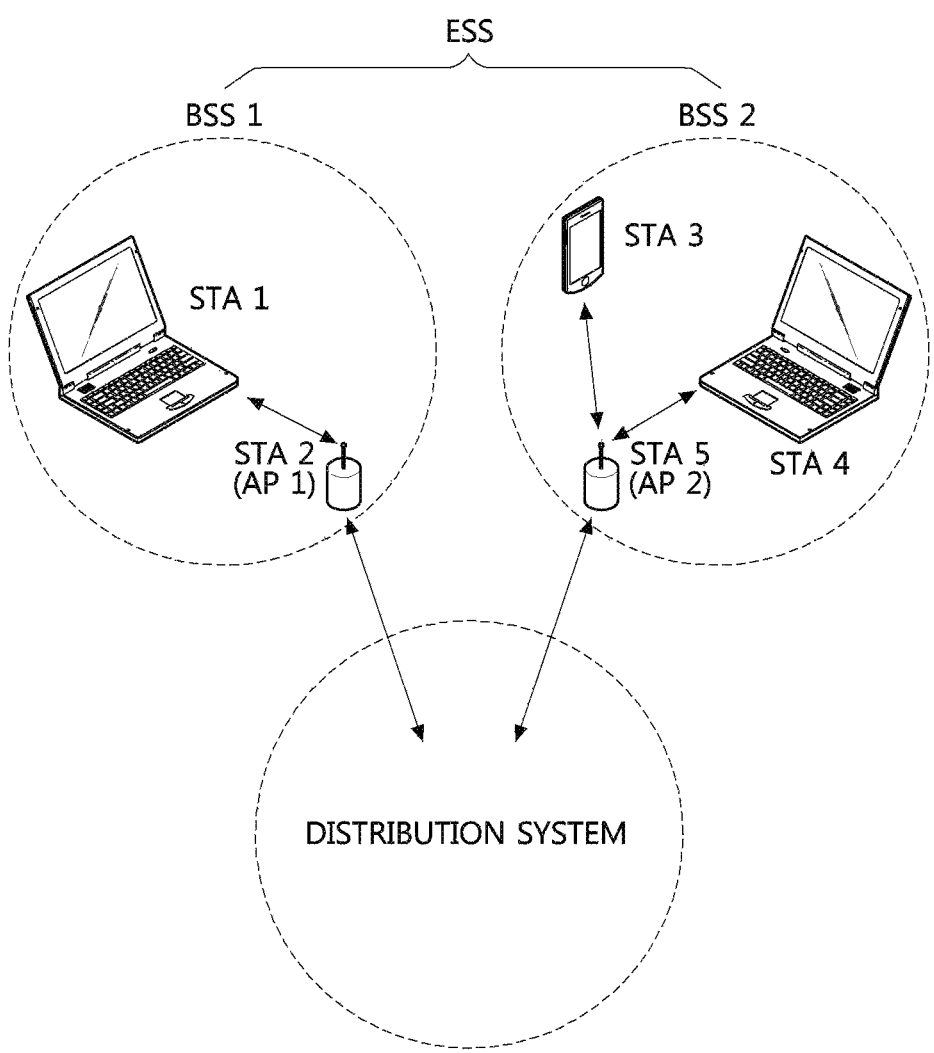
FIG. 1 is a conceptual view illustrating the configuration of an IEEE 802.11 wireless LAN system according to an example embodiment of the present invention.

Example embodiments of the present invention are disclosed herein. However, specific structural and functional details disclosed herein are merely representative for purposes of describing example embodiments of the present invention, and thus example embodiments of the present invention may be embodied in many alternate forms and should not be construed as limited to example embodiments of the present invention set forth herein.

Accordingly, while the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between", "adjacent" versus "directly adjacent", etc.).

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises," "comprising," "includes," and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, preferred example embodiments of the present invention will be described in detail with reference to the accompanying drawings. The same elements may have the same reference numerals to provide better understanding of the specification, and the details of elements identical will be omitted in order to avoid redundancy.

In this specification, a station (STA) represents a certain functional medium including a physical layer interface with respect to a medium access control (MAC) and a wireless medium according to provisions in IEEE 802.11 standards. The station STA is classified into a station serving as an access point (AP) and a station serving as a non-access point (non-AP). A station serving as an access point AP is referred to as an access point AP, and a station serving as a non-access point AP is referred to as a terminal.

The station STA includes a processor and a transceiver, and may further include a user interface and a display device. The processor represents a unit that is designed to generate a frame to be transmitted through a wireless network, or designed to process a frame received through a wireless network, and in order to control the station STA, the processor performs various functions. The transceiver represents a unit functionally connected to the processor, and designed to transmit and receive a frame for the station STA through a wireless network.

An access point AP may represent a centralized control device, a base station BS, a node-B, an e node-B, a base transceiver system (BTS), or a site control device, and may have some or the entire functions thereof.

A station may represent a wireless transmit/receive unit (WTRU), user equipment (UE), a user terminal (UT), an access terminal (AT), a mobile station (MS), a mobile terminal, a subscriber unit, a subscriber station (SS), a wireless device, or a mobile subscriber unit, and may have some or the entire functions thereof.

A station may perform communication using a desktop computer, a laptop computer, a tablet PC, a wireless phone, a mobile phone, a smart phone, an e-book reader, a Portable Multimedia Player (PMP), a portable game console, a navigation system, a digital camera, a Digital Multimedia Broadcasting (DMB) player, a digital audio recorder, a digital audio player, a digital picture recorder, a digital picture player, a digital video recorder, and a digital video player.

FIG. 1 is a conceptual view illustrating the configuration of an IEEE 802.11 wireless LAN system according to an example embodiment of the present invention.

Referring to FIG. 1, an IEEE 802.11 wireless LAN system includes at least one basic service set (BSS). BSS represents a set of stations STA 1, STA 2(AP 1), STA 3, STA 4, and STA 5(AP 2), rather than representing a designated region.

BSS is divided into an infrastructure BSS and an independent BSS (IBSS), and BSS 1 and BSS 2 each represent the infrastructure BSS. BSS1 may include a station STA1, an access point STA2 (AP1) providing a distribution service, and a distribution system DS connecting a plurality of access points STA2 (AP1) and STA5 (A2). In BSS1, the access point STA2 (AP1) manages the station STA1.

BSS2 may include stations STA3 and STA4, an access point STA5 (AP2) providing a distribution service, and the distribution system DS connecting the plurality of access points STA2 (AP1) and STA5 (A2). In BSS2, the access point STA5 (AP2) manages the stations STA3 and STA4.

Meanwhile, the independent BSS is a BSS operating in an ad-hoc mode. Since an IBSS does not include an access point, a centralized management entity performing a management function is not present at the center of the IBSS. That is, stations in an IBSS are managed in a distributed manner. All of the stations in the IBSS may be provided as a mobile station, and form a self-contained network since the stations are not allowed for an access to the DS.

The access points STA2 (AP1) and STA5 (AP2) each provide the stations STA1, STA3, and STA4 connected thereto with an access to a DS through a wireless medium. In general, communication between the stations STA1, STA3, and STA4 in the BSS1 or the BSS2 is achieved through the access point STA 2(AP 1) and STA 5(AP 2). However, when a direct link is set, a direction communication between the stations STA1, STA3, and STA4 may be possible.

A plurality of infrastructure BSSs may be connected to each other through the distribution system DS. The plurality of BSSs connected through the distribution system DS is referred to as an extended service set (ESS). Stations included in an ESS may communicate with each other, and a station in the same ESS may move from one BSS to another BSS while performing seamlessly communication.

The distribution system DS is a mechanism for allowing one access point to communicate with another access point. The distribution system DS may allow an access point to transmit a frame provided for stations connected to a BSS that is managed by the access point, or to transmit a frame provided for a station that has moved to another BSS. In addition, the access point may transmit a frame with an external network, such as a wired network. The distribution system DS does not need to be a network, and may be implemented in various forms as long as it provides a predetermined distribution service set on IEEE 802.11 standards. For example, the distribution system may be a wireless network, such as a mesh network, or a physical structure connecting access points to each other.

An active scan method of an access point according to an example embodiment of the invention may be applied to the IEEE 802.11 wireless system described above, and further applied to various network, such as a WPAN (Wireless Personal Area Network) and a WBAN (Wireless Body Area Network), in addition to the IEEE 802.11 wireless system.

Figure 2:
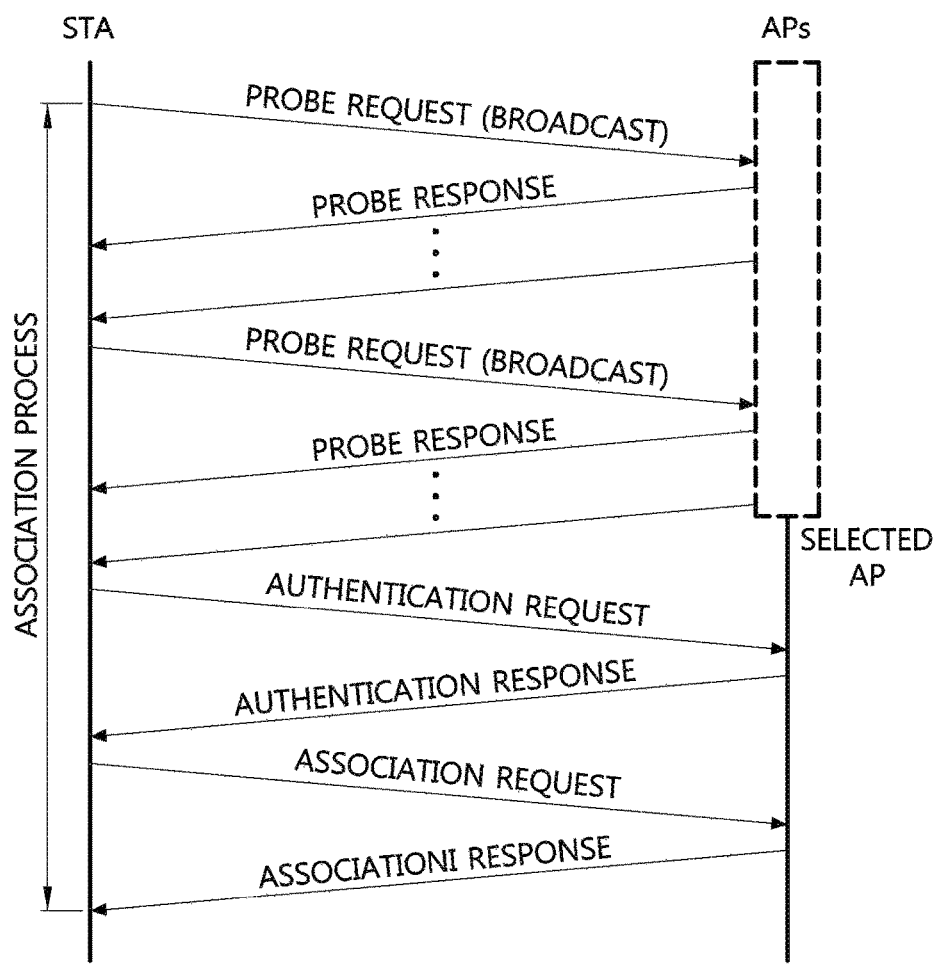
FIG. 2 is a conceptual view illustrating an association process of a station in an infrastructure basic service set (BSS)

FIG. 2 is a conceptual view illustrating an association process of a station in an infrastructure basic service set (BSS).

In order for a station STA transmits and receives data in an infrastructure BSS, first, the station STA needs to be connected to an access point AP.

Referring to FIG. 2, an association process of a station STA in an infrastructure BSS is largely divided into a probe step of finding out an access point AP, 2) an authentication step of authenticating the found access point, and 3) an association step of performing association with the authenticated access point AP.

The station STA may search for nearby access points through a probe process. The probe process is classified into a passive scan method and an active scan method. The passive scan method is performed by overhearing a beacon transmitted by nearby access points APs. Meanwhile, the active scan method is performed by broadcasting probe request frames. An access point having received the probe request frame may transmit a probe response frame corresponding to the probe request frame to a corresponding station STA. The station STA may determine existences of the nearby access points APs by receiving the probe response frame.

Thereafter, the station STA performs authentication with respect to the found access point AP, thereby performing authentication with respect to the plurality of detected access points APs. An authentication algorithm according to the IEEE 802.11 standard is classified into an open system algorithm exchanging two authentication frames and a shared key algorithm exchanging four authentication frames. By exchanging an authentication request frame and an authentication response frame based on such an authentication algorithm, the station STA performs authentication with respect to access points AP.

Finally, the station STA selects one access point among the plurality of authenticated access points APs, and performs an association with the selected access point AP. That is, the station STA transmits an association request frame to the selected access point AP, and the access point AP having received the association request frame transmits an association response frame corresponding to the association request frame to the station STA. By the process of exchanging the association request frame and the association response frame, the station STA performs the association with the access point AP.

Figure 3:
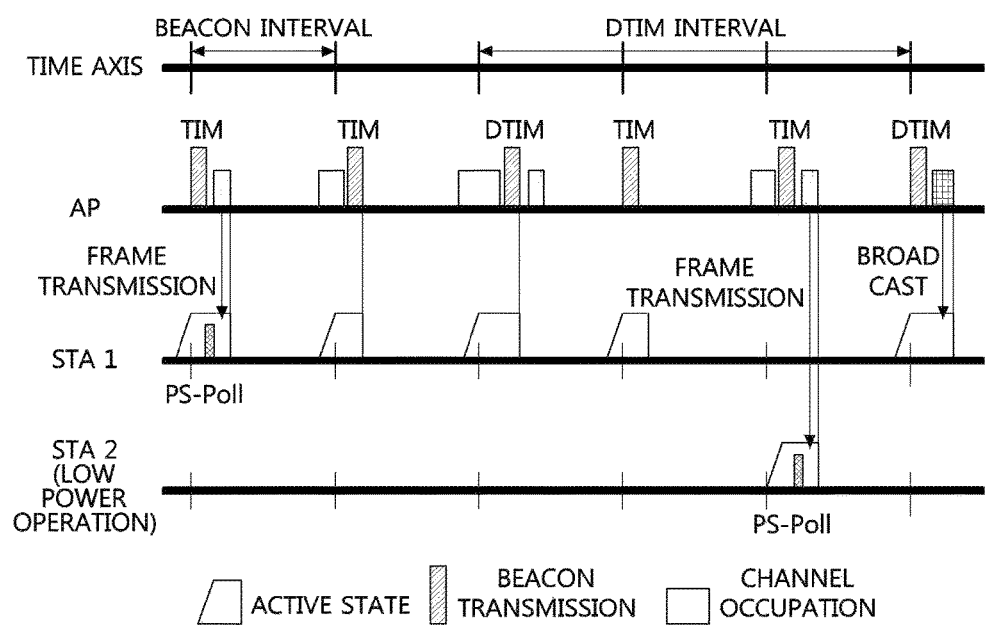
FIG. 3 is a conceptual view illustrating a data transmission process of an access point according to an example embodiment of the present invention.

FIG. 3 is a conceptual view illustrating a data transmission process of an access point according to an example embodiment of the present invention.

Referring to FIG. 3, an access point AP periodically broadcasts a beacon, and in this case, may broadcast a beacon including a delivery traffic indication message (DTIM) at an interval of three beacons. The stations STA1 and STA2 in a power save mode (PSM) may be periodically awake and receive beacons, and check a traffic indication map (TIM) or DTIM included in the beacon, thereby determining whether data to be transmitted to the stations STA1 and STA2 is buffered in the access point. If buffered data exists in the access point, the stations STA1 and STA2 are kept awake to receive the data from the access point AP. If buffered data does not exist in the access point, the stations STA1 and STA2 return to a power save mode (PSM) that is, a doze state.

That is, if a bit in a TIM corresponding AID of the stations STA1 and STA2 is set to 1, the stations STA1 and STA2 send an access point AP a Power Save (PS)-Poll frame (or trigger frame) indicating that the stations STA1 and STA2 are awake and ready for receiving data, and the access point AP having received the PS-Poll frame verifies that the stations STA1 and STA2 are ready for receiving data, and transmits data or acknowledgement (ACK) to the stations STA1 and STA2. When ACK is transmitted to the stations STA1 and STA2, the access point AP transmits data to the stations STA1 and STA2 at an adequate point of time. Meanwhile, if a bit in a TIM corresponding AID of the stations STA1 and STA2 is set to 0, the stations STA1 and STA2 return to a power save mode (PSM).

Figure 4:
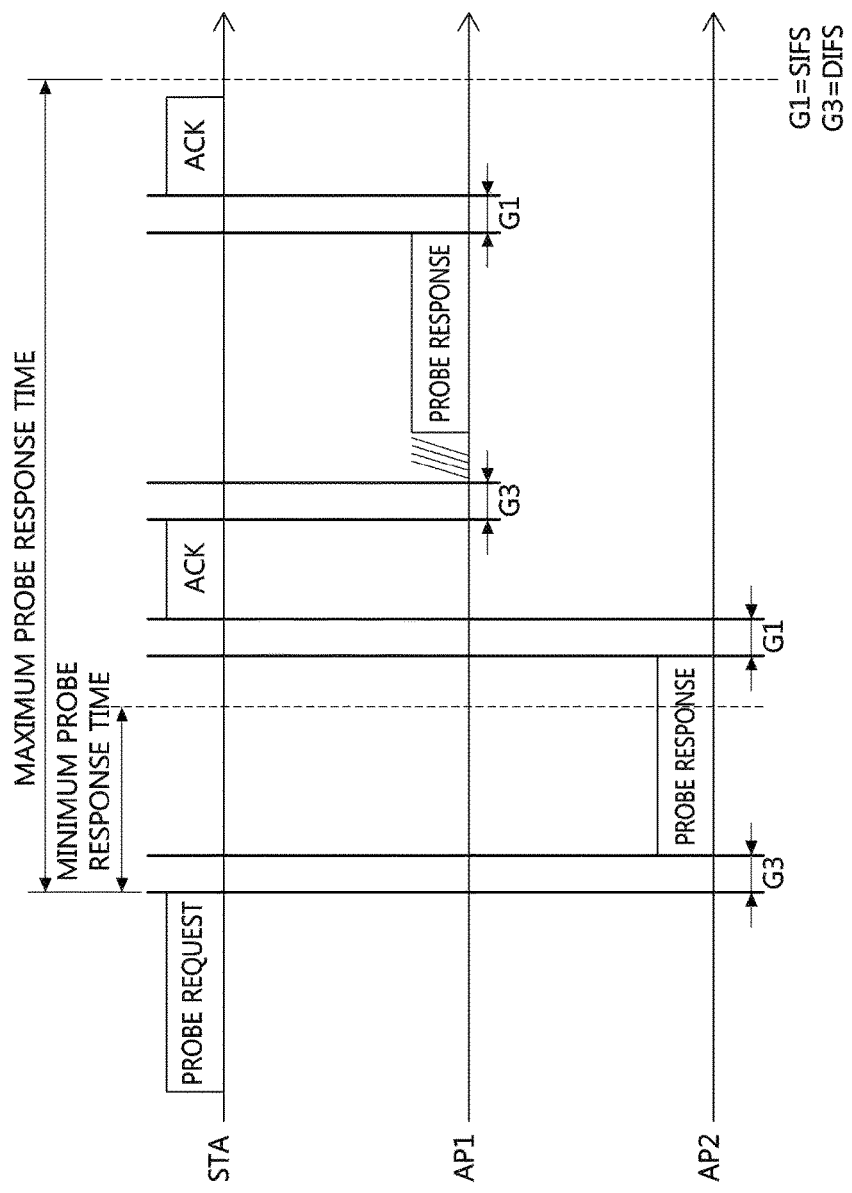
FIG. 4 is a conceptual view illustrating an active scan method according to an example embodiment of the present invention.

FIG. 4 is a conceptual view illustrating an active scan method according to an example embodiment of the present invention.

Referring to FIG. 4, the station STA may broadcast probe request frames, and access points AP1 and AP2 having received the probe request frames each may transmit a probe response frame in response to the probe request frame. If the station STA fails to receive a probe response frame during a minimum probe response time min_probe_response_time, the station STA may transmit probe request frames again. The station STA receives probe response frames during a maximum probe response time max_probe_response_time, and requests an access at an access point having the most superior wireless environment among the access points AP1 and AP2 having transmitted probe response frames. That is, the station needs to wait for the maximum probe response time to elapse even after receiving a probe response frame from an access point having a superior wireless environment, which causes waste of time.

FIG. 5 is a flowchart showing an active scan method according to an example embodiment of the present invention.

Referring to FIG. 5, an active scan method performed at a station includes generating a probe request frame including signal strength information of the station (S100), and transmitting the probe request frame to access points (S110). In addition, the active scan method may further include receiving a probe response frame corresponding to the probe request frame from a certain access point (S120), and performing an access to the certain access point (S130).

In operation S100, the station may generate a probe request frame including signal strength information of the station, and the signal strength information may include transmission power (Tx power) information. That is, the signal strength may represent transmission power.

FIG. 6 is a conceptual view illustrating the configuration of a probe request frame.

Referring to FIG. 6, the probe request frame may include transmission power 5 (Tx power). That is, the station may generate a probe request frame including transmission power information as shown in FIG. 6.

Referring again to FIG. 5, in operation S110, the station may transmit the probe request frame to access points. In this case, the station may transmit a probe request frame to a designated access point, or an undesignated access point (that is, broadcasting).

In operation S120, the station may receive a probe response frame corresponding to the probe request frame from a certain access point. The certain access point may represent one access point among access points having received the probe request frame. In addition, the certain access point may represent an access point satisfying a predetermined standard for uplink quality with respect to the station (for example, uplink path loss). The predetermined standard may represent a target path loss (uplink target path loss), and the certain access point may represent an access point having an uplink path loss equal to or smaller than the target path loss.

In operation 130, the station may perform an access (that is, an authentication process and an association process) to the certain access point. The station may perform an access to the certain access point before a preset maximum probe response time elapses. That is, the station may perform an access to the certain access point instantly after receiving a probe response frame. If the uplink path loss satisfies the predetermined standard, it is determined that uplink quality between the certain access point and the station is fair, and thus the station may perform an access to the certain access point without receiving another probe response frame during the time remaining in the maximum probe response time.

FIG. 7 is a flowchart showing an active scan method according to another example embodiment of the present invention.

Referring to FIG. 7, an active scan method performed at a station includes generating a probe request frame including signal strength information of the station (S200), transmitting the probe request frame to access points (S210), receiving a probe response frame corresponding to the probe request frame from a certain access point (S220), acquiring a downlink path loss based on signal strength of the probe response frame (S230), and performing an access to the certain access point if the downlink path loss satisfies a predetermined standard (S240).

In operation S200, the station may generate a probe request frame including signal strength information of the station, and the signal strength information may include transmission power information. That is, the signal strength may represent transmission power.

In operation S210, the station may transmit the probe request frame to access points. The station may transmit a probe request frame to a designated access point, or an undesignated access point (that is, broadcasting).

In operation S220, the station may receive a probe response frame corresponding to the probe request frame from a certain access point. The certain access point may represent one access point among access points having received the probe request frame. In addition, the certain access point may represent an access point satisfying a predetermined standard for uplink quality with respect to the station (for example, uplink path loss). The predetermined standard may represent a target path loss (uplink target path loss), and the certain access point may represent an access point having an uplink path loss equal to or smaller than the target path loss.

In operation S230, the station may acquire a downlink path loss based on signal strength of the probe response frame. If transmission power of the certain access point is identified, the station may acquire the downlink path loss through a difference between the transmission power of the certain access point and the received signal strength of the probe response frame. Alternatively, the station may acquire transmission power of the certain access point through the probe response frame. That is, the certain access point may generate a probe response frame including transmission power information of the certain access point, and transmit the probe response frame to the station, and the station may acquire the transmission power of the certain access point through the probe response frame.

In operation S240, the station may perform an access to the certain access point if the downlink path loss satisfies a predetermined standard. The predetermined standard may represent a target path loss (downlink target path loss), and the target path loss may be transmitted to the station while included in the probe response frame.

FIGS. 8 and 9 are conceptual views illustrating the configuration of a probe response frame.

Referring to FIGS. 8 and 9, a probe response frame includes information about a target path loss 23. That is, a certain access point may generate a probe response frame including target path loss information as shown in FIGS. 8 and 9, and provide a station with the generated probe response frame.

Referring again to FIG. 7, the station may perform an access (that is, an authentication process and an association process) to the certain access point if a downlink path loss is equal to or smaller than the target path loss. The station may perform an access to the certain access point before a preset maximum probe response time elapses. That is, the station may perform an access to a certain access point instantly after receiving a probe response frame satisfying a predetermined standard.

If the downlink path loss satisfies the predetermined standard, it is determined that downlink quality between the certain access point and the station is fair, and thus the station may perform an access to the certain access point without receiving another probe response frame during the time remaining in the maximum probe response time.

Meanwhile, the station may receive a probe response frame from another access point if the downlink path loss is larger than the target path loss.

Figure 10:
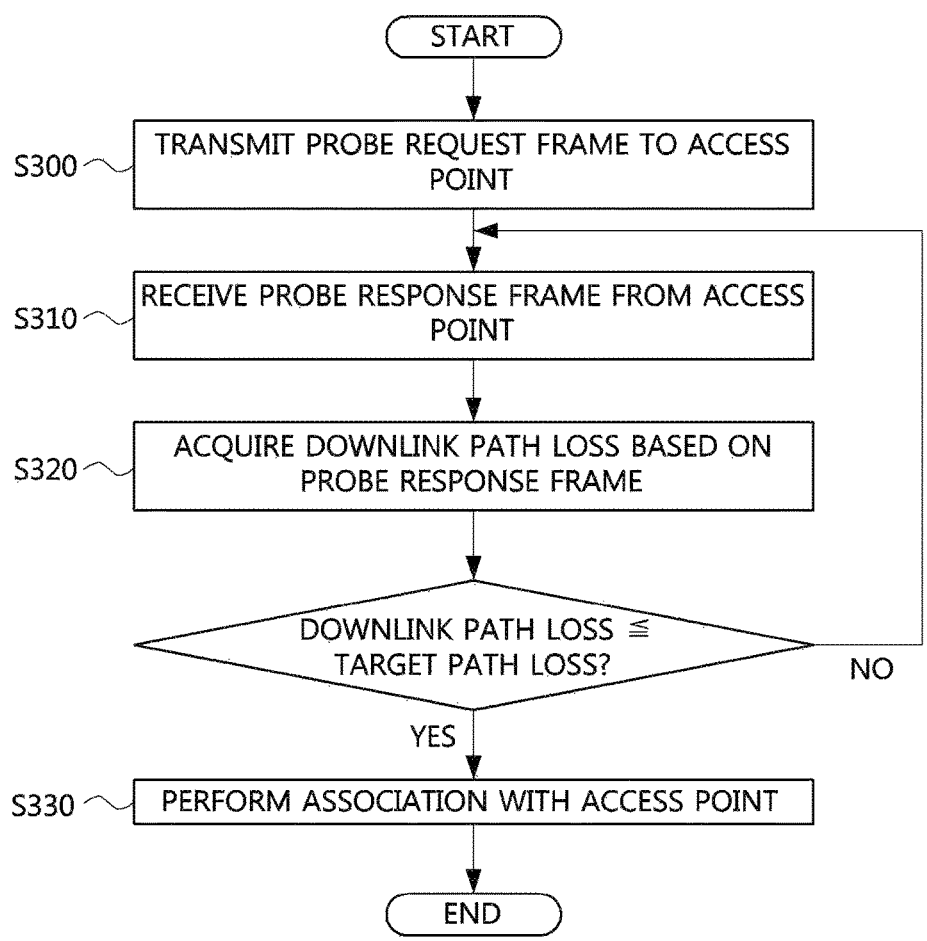
FIG. 10 is a flowchart showing an active scan method according to still another example embodiment of the present invention.

FIG. 10 is a flowchart showing an active scan method according to still another example embodiment of the present invention.

Referring to FIG. 10, an active scan method performed at a station includes transmitting a probe request frame to access points (S300), receiving a probe response frame corresponding to the probe request frame from a certain access point (S310), acquiring information about downlink quality based on signal strength of the probe response frame (S320), and performing an access to the certain access point if the downlink quality satisfies a predetermined standard (S330).

In operation S300, the station may transmit a probe request frame to access points. In this case, the station may transmit a probe request frame to a designated access point, or an undesignated access point (that is, broadcasting).

In operation S310, the station may receive a probe response frame corresponding to the probe request frame from a certain access point. The certain access point may represent one access point among access points having received the probe request frame.

In operation S320, the station may acquire information about downlink quality based on received signal strength of the probe response frame. The information about downlink quality may include information about downlink path loss. That is, the downlink quality may represent downlink path loss. When transmission power of a certain access point is identified, the station may acquire the downlink path loss through a difference between the transmission power of the certain access point and received signal strength of the probe response frame. Alternatively, the station may acquire the transmission power of the certain access point through the probe response frame. That is, a certain access point may generate a probe response frame including transmission power information of the certain access point, and transmit the probe response frame to a station, and the station may acquire the transmission power of the certain access point through the probe response frame.

In operation S330, if a downlink path loss satisfies a predetermined standard, the station may perform an access to the certain access point. The predetermined standard may represent a target path loss (downlink target path loss), and the target path loss may be transmitted to the station while included in the probe response frame.

The station may perform an access (that is, an authentication process and an association process) to the certain access point if the downlink path loss is equal to or smaller than the target path loss. The station may perform an access to the certain access point before a preset maximum probe response time elapses. That is, the station may perform an access to a certain access point instantly after receiving a probe response frame satisfying a predetermined standard.

Meanwhile, the station may receive a probe response frame from another access point if the downlink path loss is larger than the target path loss.

Figure 11:
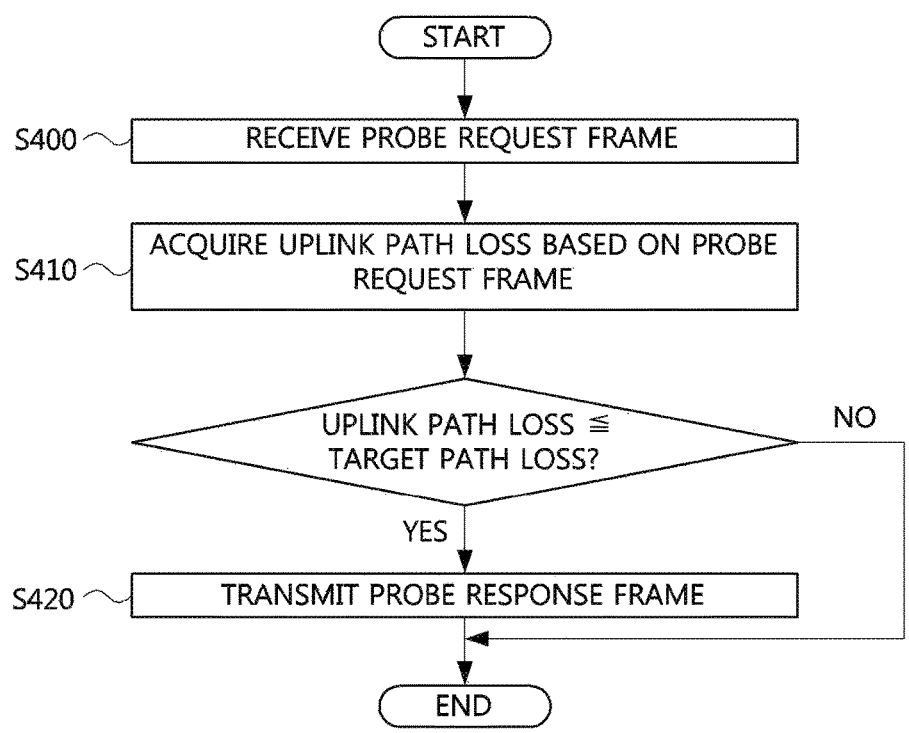
FIG. 11 is a flowchart showing an active scan-based responding method according to an example embodiment of the present invention.

FIG. 11 is a flowchart showing an active scan-based responding method according to an example embodiment of the present invention.

Referring to FIG. 11, an active scan-based responding method performed at an access point includes receiving a probe request frame from a station (S400), acquiring information about uplink quality based on signal strength information of the station included in the probe request frame (S410), and transmitting a probe response frame to the station if the uplink quality satisfies a predetermined standard (S420).

In operation S400, the access point may receive a probe request frame from a station. That is, an SSID included in the probe request frame corresponds to an SSID of the access point or sets in null, the access point may receive the probe request frame.

In operation S410, the access point may acquire uplink quality information based on signal strength information of the station included in the probe request frame. The signal strength information of the station represents transmission power information of the station, and the uplink quality information represents uplink path loss information. That is, the access point may acquire an uplink path loss through a difference between the transmission power of the station included in the probe request frame and received signal strength of the probe request frame.

In operation S420, the access point may transmit a probe response frame to the station if the uplink path loss satisfies a predetermined standard. The predetermined standard may represent a target path loss (uplink target path loss). That is, the access point may transmit a probe response frame to the station if uplink quality (that is, uplink path loss) is equal to or smaller than the target path loss. Meanwhile, the access point does not transmit a probe response frame to the station if the uplink quality (that is, uplink path loss) is larger than the target path loss.

When the access point transmits a probe response frame, the access point may transmit the probe response frame including target path loss information (downlink target path loss) to the station. The target path loss information included in the probe response frame may be used for the station to acquire downlink quality.

Figure 12:
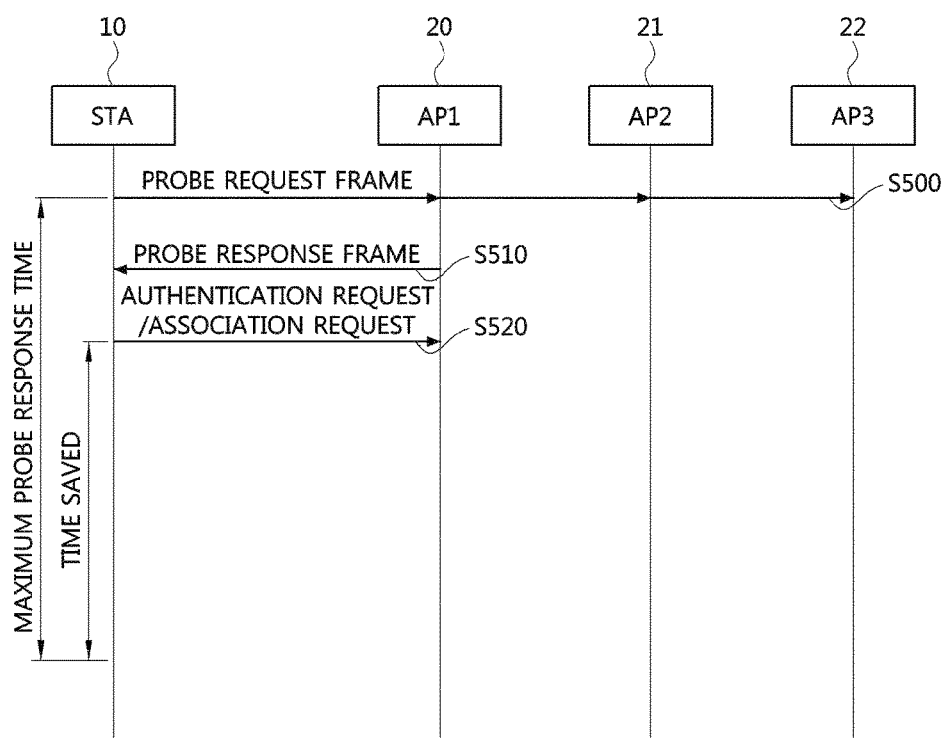
FIG. 12 is a flowchart showing an active scan method of an access point according to an example embodiment of the present invention.

FIG. 12 is a flowchart showing an active scan method of an access point according to an example embodiment of the present invention.

Referring to FIG. 12, a station 10 may broadcast probe request frames (S500). Access points 20, 21, and 22 may calculate an uplink path loss based on the received probe request frame. That is, the uplink path loss may be calculated based on transmission power of the station 10 included in the probe request frame and received signal strength of the probe request frame. A corresponding access point may transmit a probe response frame to the station 10 if the uplink path loss is equal to or smaller than a predetermined standard (that is, uplink target path loss) (S510).

For example, a first access point 20 may transmit a probe response frame to the station 10 if an uplink path loss with respect to the first access point 20 is equal to or smaller than the predetermined standard.

The station 10 may receive the probe response frame from the first access point 20, and perform an access to the first access point 20 instantly after receiving the probe response frame, that is, perform an authentication process and an association process (S520). The station may perform an access to the first access point 20 before a preset maximum probe response time elapses. If the uplink path loss satisfies the predetermined standard, it is determined that an uplink quality between the first access point 20 and the station is fair, and thus the station may perform an access to the first access point 20 without receiving another probe response frame during the time remaining in the maximum probe response time.

As is apparent from the above, an access point transmits a probe response frame only to a station having an uplink path loss with respect to a probe request frame satisfying a predetermined standard, thereby preventing unnecessary wireless resources from being wasted.

Meanwhile, a station instantly performs association with respect to an access point without waiting for the maximum probe response time to pass, if a downlink path loss with respect to a probe response frame is satisfied with a predetermined standard, thereby preventing unnecessary time from being wasted.

While the example embodiments of the present invention and their advantages have been described in detail, it should be understood that various changes, substitutions, and alterations may be made herein without departing from the scope of the invention.

What is claimed is:

1. A method for active scanning performed by a station, the method comprising:
   transmitting, to an access point, a probe request frame including information on a signal strength; and
   receiving, from the access point, a probe response frame in response to the probe request frame,
   wherein the probe response frame is transmitted by the access point based on the information on the signal strength,
   wherein the station accesses the access point based on the probe response frame and a maximum probe response time.

2. The method of claim 1,
   wherein the maximum probe response time comprises a preset maximum time period during which the station is required to wait for the probe response frame from the access point.

3. The method of claim 1,
   wherein the information on the signal strength includes information about transmission power of the station.

4. The method of claim 1,
   wherein the access point is an access point satisfying a predetermined standard for an uplink quality with respect to the station.

5. The method of claim 2, wherein the station accesses the access point before the maximum probe response time elapses.

6. The method of claim 1, further comprising:
   acquiring a downlink path loss based on a signal strength of the probe response frame; and
   accessing the certain access point in response to determining that the downlink path loss satisfies a predetermined standard.

7. The method of claim 6, wherein the probe response frame includes target path loss information as the predetermined standard.

8. The method of claim 6, wherein the access point satisfies the predetermined standard for an uplink quality with respect to the station.

9. A method for active scanning performed by an access point, the method comprising:
   receiving, from a station, a probe request frame including information on a signal strength; and
   transmitting, to the station, a probe response frame in response to the probe request frame based on the information on the signal strength,
   wherein an access of the station to the access point is based on the probe response frame and a maximum probe response time.

10. A station configured to perform an active scanning, the station comprising:
    a transceiver; and
    a processor,
    wherein the processor is configured to:
    cause the transceiver to transmit, to an access point, a probe request frame including information on a signal strength; and
    cause the transceiver to receive, from the access point, a probe response frame in response to the probe request frame, and
    wherein the probe response frame is transmitted by the access point based on the information on the signal strength,
    wherein the station accesses the access point based on the probe response frame and a maximum probe response time.

11. An access point configured to perform an active scanning, the access point comprising:
    a transceiver; and
    a processor, a
    wherein the processor is configured to:

cause the transceiver to receive, from a station, a probe request frame including information on a signal strength; and cause the transceiver to transmit, to the station, a probe response frame in response to the probe request frame based on the information on the signal strength, wherein an access of the station to the access point is based on the probe response frame and a maximum probe response time.

* * * * *